(12) United States Patent
Maruyama et al.

(10) Patent No.: US 12,204,711 B2
(45) Date of Patent: Jan. 21, 2025

(54) ATTACHMENT, INPUT DEVICE, INPUT METHOD, AND COMPUTER PROGRAM

(71) Applicant: Sharp Display Technology Corporation, Kameyama (JP)

(72) Inventors: Takenori Maruyama, Kameyama (JP); Shinji Yamagishi, Kameyama (JP); Takuma Yamamoto, Kameyama (JP); Kazutoshi Kida, Kameyama (JP); Yasuhiro Sugita, Kameyama (JP); Hiroshi Fukushima, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/413,377

(22) Filed: Jan. 16, 2024

(65) Prior Publication Data

US 2024/0264687 A1 Aug. 8, 2024

(30) Foreign Application Priority Data

Feb. 8, 2023 (JP) .................. 2023-017902

(51) Int. Cl.
  *G06F 3/041* (2006.01)
  *G06F 1/16* (2006.01)
  *G06F 3/02* (2006.01)

(52) U.S. Cl.
  CPC .......... *G06F 3/0412* (2013.01); *G06F 1/1607* (2013.01); *G06F 3/0227* (2013.01)

(58) Field of Classification Search
  CPC .... G06F 1/1607; G06F 3/0227; G06F 3/0393; G06F 3/0412; G06F 2203/04809
  See application file for complete search history.

(56) References Cited

U.S. PATENT DOCUMENTS

| | | | | |
|---|---|---|---|---|
| 8,237,662 B2* | 8/2012 | Li | ............... | G06F 3/0202 345/169 |
| 8,482,540 B1* | 7/2013 | Reeves | ............... | G06F 3/0393 345/173 |
| 10,042,480 B2* | 8/2018 | Krahenbuhl | ............... | G06F 3/046 |
| 10,921,912 B2* | 2/2021 | Kumar | ............... | G06F 3/039 |
| 11,662,843 B2* | 5/2023 | Kumar | ............... | G06F 3/044 345/173 |
| 2006/0256090 A1* | 11/2006 | Huppi | ............... | A63F 13/92 345/173 |
| 2010/0026646 A1* | 2/2010 | Xiao | ............... | G06F 1/1626 345/173 |
| 2010/0110013 A1* | 5/2010 | Li | ............... | G06F 3/0202 345/169 |
| 2011/0248947 A1* | 10/2011 | Krahenbuhl | ............... | G06F 1/1671 345/174 |
| 2015/0035760 A1* | 2/2015 | Wu | ............... | G06F 3/0393 345/173 |

(Continued)

FOREIGN PATENT DOCUMENTS

JP 2015-073179 A 4/2015

*Primary Examiner* — Michael Pervan
(74) *Attorney, Agent, or Firm* — ScienBiziP, P.C.

(57) ABSTRACT

An attachment is attachable to and detachable from a touch panel of an input device including the touch panel, and supports user operation on the input device by being attached to the touch panel. The attachment includes one or more operation units that receive user operation and transmit the user operation to a corresponding position of the touch panel when attached to the touch panel.

10 Claims, 15 Drawing Sheets

(56) References Cited

U.S. PATENT DOCUMENTS

| | | | |
|---|---|---|---|
| 2019/0042040 A1* | 2/2019 | Kumar | G06F 3/0412 |
| 2021/0165502 A1* | 6/2021 | Kumar | G06F 3/039 |
| 2021/0263560 A1* | 8/2021 | Tsuchihashi | G06F 1/1652 |
| 2023/0251717 A1* | 8/2023 | Dong | G06F 3/041 |
| | | | 345/169 |

* cited by examiner

ATTACHMENT, INPUT DEVICE, INPUT METHOD, AND COMPUTER PROGRAM

CROSS-REFERENCE TO RELATED APPLICATIONS

This application claims the benefit of priority to Japanese Patent Application Number 2023-017902 filed on Feb. 8, 2023. The entire contents of the above-identified application are hereby incorporated by reference.

BACKGROUND

Technical Field

The present disclosure relates to an attachment, an input device, an input method, and a computer program.

As disclosed in JP 2015-73179 A, for example, an input device that uses, as a smooth keyboard, a panel (touch panel) provided with a touch sensor is known. JP 2015-73179 A discloses a display device including a panel set provided with a plurality of panels. The panel set includes a display panel for displaying an image and a touch sensor. At least one or more recessed portions are formed in a region of an outermost surface of the panel set where the image is displayed.

SUMMARY

In the display device disclosed in JP 2015-73179 A, a deformation such as a recessed portion is provided in advance on an outermost surface of the panel set. As a result, the input device cannot be used as a smooth input device free of deformation. For example, in a case in which one or more recessed portions having a keyboard shape are formed in advance in the touch panel, operability as an input device is maintained in a case in which operation that utilizes the keyboard shape is desirably performed. However, the keyboard shape cannot be removed from the touch panel and thus, even when usage of a smooth touch panel free of recessed portions is desired, the touch panel is used in a state in which the recessed portions are present, impairing convenience. Therefore, both user convenience and operability as an input device are in demand.

According to an embodiment, an attachment is attachable to and detachable from a touch panel of an input device including the touch panel, and the attachment is configured to support user operation on the input device by being attached to the touch panel. The attachment includes one or more operation units configured to receive user operation and transmit the user operation to a corresponding position of the touch panel when the attachment is attached to the input device.

Further details are described in the embodiments below.

BRIEF DESCRIPTION OF DRAWINGS

The disclosure will be described with reference to the accompanying drawings, wherein like numbers reference like elements.

DESCRIPTION OF EMBODIMENTS

Overview of Input System

Figure 1:
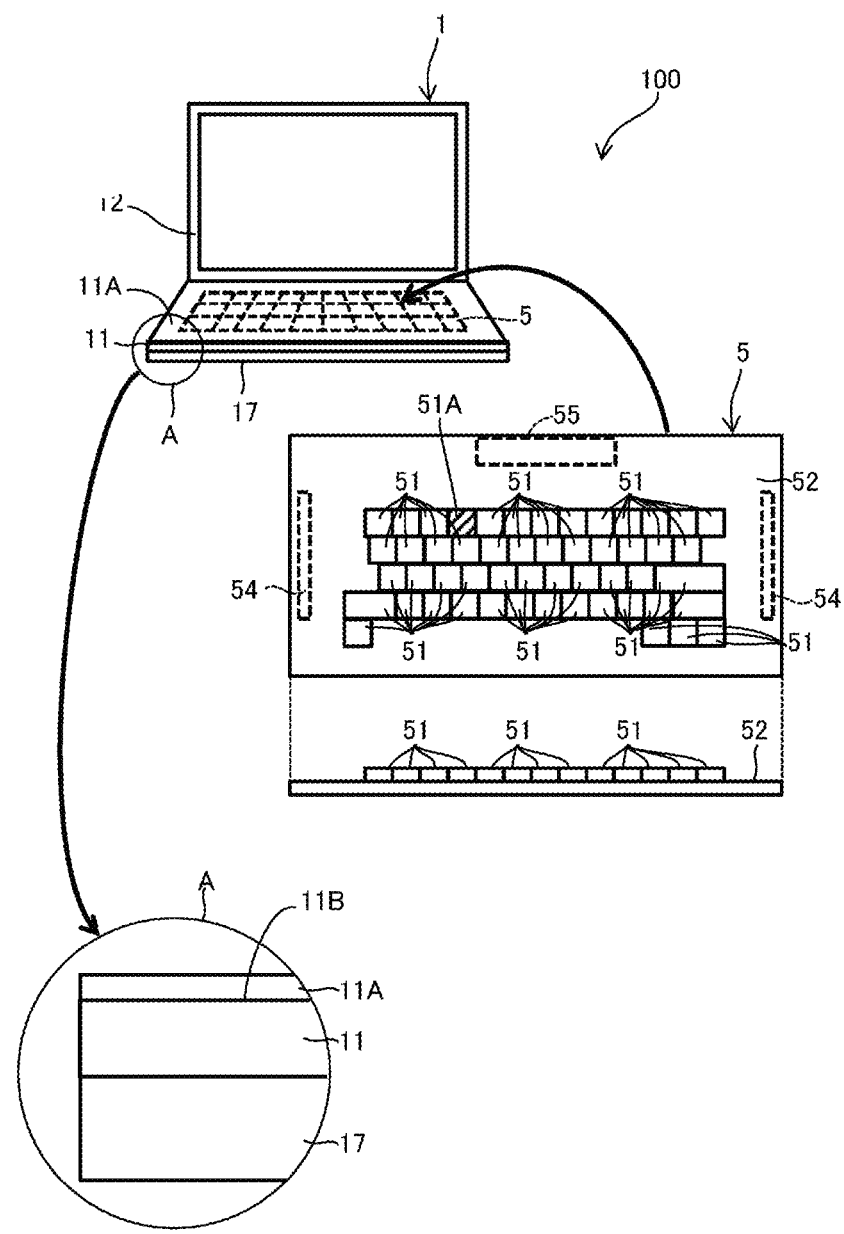
FIG. 1 is a schematic view of an input system according to an embodiment.

FIG. 1 is a schematic view of an input system 100 according to the present embodiment. The input system 100 includes an input device 1 provided with a touch panel 11A, and an attachment 5 attachable to and detachable from the touch panel 11A of the input device 1. The attachment 5 is attached to the touch panel 11A, thereby supporting operation by a user for information input to the input device 1 (hereinafter referred to as user operation).

First Embodiment

Description of Input Device

The input device 1 is, for example, a personal computer including two screens of a first display 11 and a second display 12. The first display 11 is a liquid crystal display or an organic electroluminescent (EL) display, for example. A portion A of FIG. 1 is a schematic view of a portion of a cross section of the first display 11.

The first display 11 includes a display surface 11B for displaying an image. The touch panel 11A is disposed on the first display 11 by an out-cell method, for example. That is, the touch panel 11A is disposed on the display surface 11B of the first display 11. The method of disposing the touch panel 11A on the first display 11, as another example, may be an on-cell method or may be an in-cell method.

Figure 2:
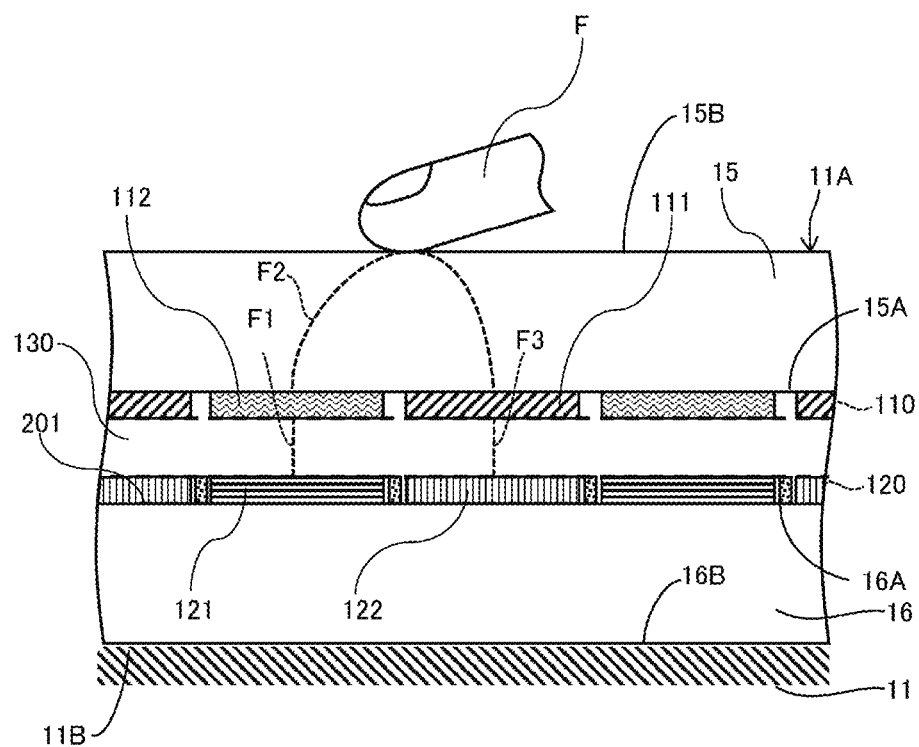
FIG. 2 is a schematic cross-sectional view illustrating an example of a touch panel of an input device included in the input system of FIG. 1.

The touch panel 11A is, for example, a capacitive touch panel, and can detect both contact not accompanied by a pressing force by a pointer (touch), and a pressing force. FIG. 2 is a cross-sectional view illustrating an example of the touch panel 11A. The touch panel 11A includes a first electrode layer 110 and a second electrode layer 120 that are interposed between a first substrate 15 and a second substrate 16 that are dielectrics. The first electrode layer 110 and the second electrode layer 120 are layered with a dielectric layer 130 interposed therebetween.

The first electrode layer 110 includes a drive electrode 111 and a floating island electrode 112. The second electrode layer 120 includes a position detection electrode 121 and a pressing force detection electrode 122. A shield electrode may be disposed between the position detection electrode 121 and the pressing force detection electrode 122.

The first substrate 15 and the second substrate 16 are formed of a dielectric transparent material such as glass or a polyethylene terephthalate (PET) film, for example. The drive electrode 111, the floating island electrode 112, the position detection electrode 121, and the pressing force detection electrode 122 are formed of a conductive transparent material such as indium tin oxide (ITO), for example. The dielectric layer 130 is formed of a dielectric transparent material having elasticity such as a polymer material, an optical clear adhesive (OCA), or an optical clear resin (OCR), for example.

The first substrate 15 and the second substrate 16 are disposed so that a first surface 15A of the first substrate 15 and a first surface 16A of the second substrate 16 face each other. The drive electrode 111 is formed on the first surface 15A of the first substrate 15. The floating island electrode 112 is in a floating state and is formed on the first surface 15A of the first substrate 15. The position detection electrode 121 is formed on the first surface 16A of the second substrate 16. The pressing force detection electrode 122 is formed on the first surface 16A of the second substrate 16.

The drive electrode 111 is supplied with a drive signal. The position detection electrode 121 is an electrode for detecting a position of a pointer F. The pressing force detection electrode 122 is an electrode for detecting a magnitude of a pressing force by the pointer F.

The touch panel 11A is disposed so that a second surface 16B of the second substrate 16 on a side opposite to the first surface 16A is in contact with the display surface 11B of the first display 11. A second surface 15B of the first substrate 15 on a side opposite to the first surface 15A is a front surface of the touch panel 11A. The second surface 15B receives operation accompanied by contact by the pointer F such as a finger.

Figure 3:
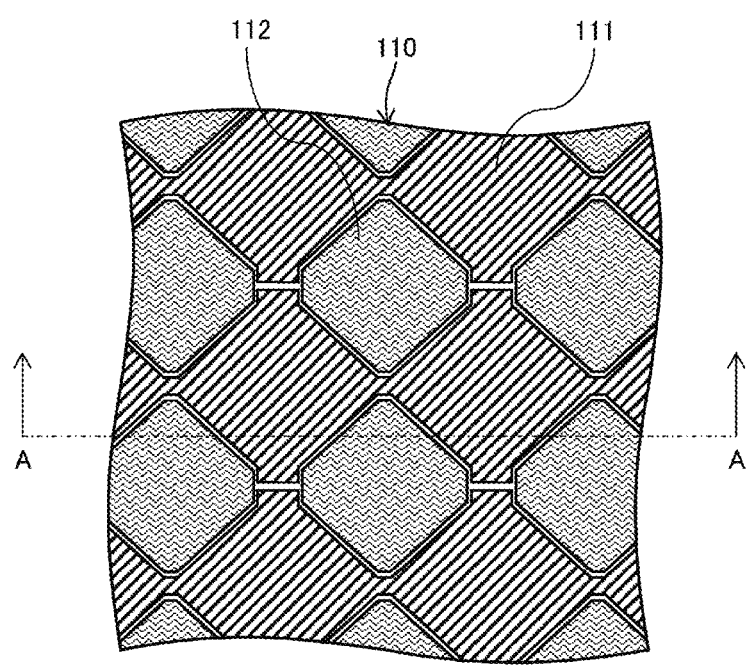
FIG. 3 is a plan view schematically illustrating a configuration of a first electrode layer of the touch panel of FIG. 2.
Figure 4:
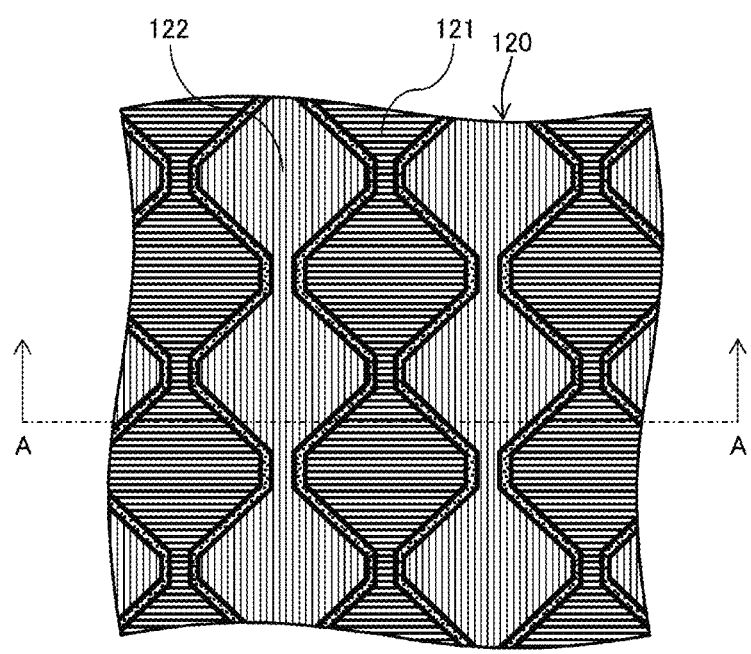
FIG. 4 is a plan view schematically illustrating a configuration of a second electrode layer of the touch panel of FIG. 2.

FIG. 3 is a plan view schematically illustrating a configuration of the first electrode layer 110. FIG. 4 is a plan view schematically illustrating a configuration of the second electrode layer 120. FIG. 2 is a cross-sectional view taken along line A-A in FIGS. 3 and 4.

The drive electrode 111 has a shape (diamond pattern) in which a plurality of rhombus-shaped electrodes are connected to each other in diagonal directions thereof. In addition, the floating island electrode 112 is constituted by a plurality of rhombus-shaped electrodes that are not connected to each other. The position detection electrode 121, similar to the drive electrode 111, has a diamond pattern in which a plurality of rhombus-shaped electrodes are connected to each other. Further, the pressing force detection electrode 122 also has a diamond pattern in which a plurality of rhombus-shaped electrodes are connected to each other. The respective connecting directions of the rhombus-shaped electrodes in the position detection electrode 121 and the pressing force detection electrode 122 are parallel to each other, and the position detection electrode 121 and the pressing force detection electrode 122 are alternately disposed with respect to a direction perpendicular to the connecting directions. The respective connecting directions of the rhombus-shaped electrodes in the position detection electrode 121 and the pressing force detection electrode 122 are perpendicular to a connecting direction of the rhombus-shaped electrodes in the drive electrode 111.

In a plan view in which the second substrate 16 is viewed from the first substrate 15 (hereinafter, simply referred to as "plan view"), the drive electrode 111 covers at least a portion of the pressing force detection electrode 122. In the touch panel 11A, one rhombus-shaped electrode constituting the drive electrode 111 includes one rhombus-shaped electrode constituting the pressing force detection electrode 122 in a plan view. Similarly, one rhombus-shaped electrode constituting the floating island electrode 112 includes one rhombus-shaped electrode constituting the position detection electrode 121 in a plan view.

Detecting touch by the pointer F on the touch panel 11A includes detecting contact on the front surface and detecting a contacted position (operation position). Detecting the pressing force by the pointer F on the touch panel 11A includes detecting the front surface being pressed and detecting a pressed position (operation position). Detecting the pressing force may further include detecting a magnitude of the pressing force.

With the first electrode layer 110 illustrated in FIG. 3 and the second electrode layer 120 illustrated in FIG. 4 disposed as described above, the floating island electrode 112 and the position detection electrode 121 are capacitively coupled with each other as indicated by an electric force line F1. When the pointer F comes into contact with a front surface, the drive electrode 111 and the floating island electrode 112 are capacitively coupled with each other, as indicated by an electric force line F2. Therefore, the drive electrode 111 and the position detection electrode 121 are capacitively coupled with each other via the floating island electrode 112. As a result, the electrostatic capacitance between the drive electrode 111 and the position detection electrode 121 decreases via the pointer F, and this results in a change in the signal detected at the position detection electrode 121. Contact of the pointer F with the front surface of the touch panel 11A and the operation position are detected on the basis of the change in the signal detected at the position detection electrode 121.

With the first electrode layer 110 illustrated in FIG. 3 and the second electrode layer 120 illustrated in FIG. 4 disposed as described above, the drive electrode 111 and the pressing force detection electrode 122 are capacitively coupled with each other as indicated by an electric force line F3. Here, when the first substrate 15 is pressed by the pointer F, the dielectric layer 130, being a material having elasticity, is compressed, shortening a distance between the drive electrode 111 and the pressing force detection electrode 122. As a result, the electrostatic capacitance between the drive electrode 111 and the pressing force detection electrode 122 increases, and this results in a change in the signal detected at the pressing force detection electrode 122. Receiving a pressing force at the front surface of the touch panel 11A by the pointer F, the operation position, and the magnitude of the pressing force are detected on the basis of the change in the signal detected at the pressing force detection electrode 122.

Preferably, the input device 1 includes a haptic device 17, as illustrated in FIG. 1. The haptic device 17 is, for example, a piezoelectric haptic device that uses a piezoelectric element, or a device that uses an actuator such as a piezoelectric thin film actuator.

The haptic device 17 is disposed so as to receive a vibration generated by operation by the pointer F on the touch panel 11A and to apply a mechanical stimulus to the touch panel 11A. As an example, the haptic device 17 is disposed on a back surface side of the touch panel 11A with the first display 11 interposed therebetween, as illustrated in the portion A of FIG. 1.

The haptic device 17 applies the mechanical stimulus to the touch panel 11A in accordance with the vibration received from the touch panel 11A. The mechanical stimulus includes at least one sensation of a force sensation, a touch sensation, and a pressing sensation. Therefore, in a case in which the user uses the first display 11 for input operation, the user can obtain an operation feel like a physical key operation through the pointer F such as a finger.

When the attachment 5 is attached to the touch panel 11A, the mechanical stimulus applied to the touch panel 11A by the haptic device 17 is transmitted to the pointer F via the attachment 5. Therefore, the user who attaches the attachment 5 to the touch panel 11A and performs operation can obtain an operation feel corresponding to the user operation through the attachment 5.

Description of Attachment

For example, when user operation is performed using the touch panel 11A as a keyboard (keyboard input), the attachment 5 is attached to the touch panel 11A and supports the keyboard input by the user. The attachment 5 includes one or more operation units 51. Each operation unit 51 corresponds to a key. The operation unit 51 receives user operation (touch of the pointer F). The operation unit 51 transmits the user operation to a position corresponding to the touch panel 11A when attached to the input device 1.

The operation units 51 are disposed on a base 52. The operation units 51 corresponding to each key are arrayed as a keyboard on the base 52. Accordingly, the attachment 5 is attached to the touch panel 11A, and thus the operation units 51 corresponding to each key are arrayed as a keyboard on the front surface of the touch panel 11A.

Transmitting the touch operation to the touch panel 11A by the operation unit 51 refers to, for example, transmitting the contact of the pointer F such as a finger, or transmitting the pressing force by the pointer F.

Figure 5:
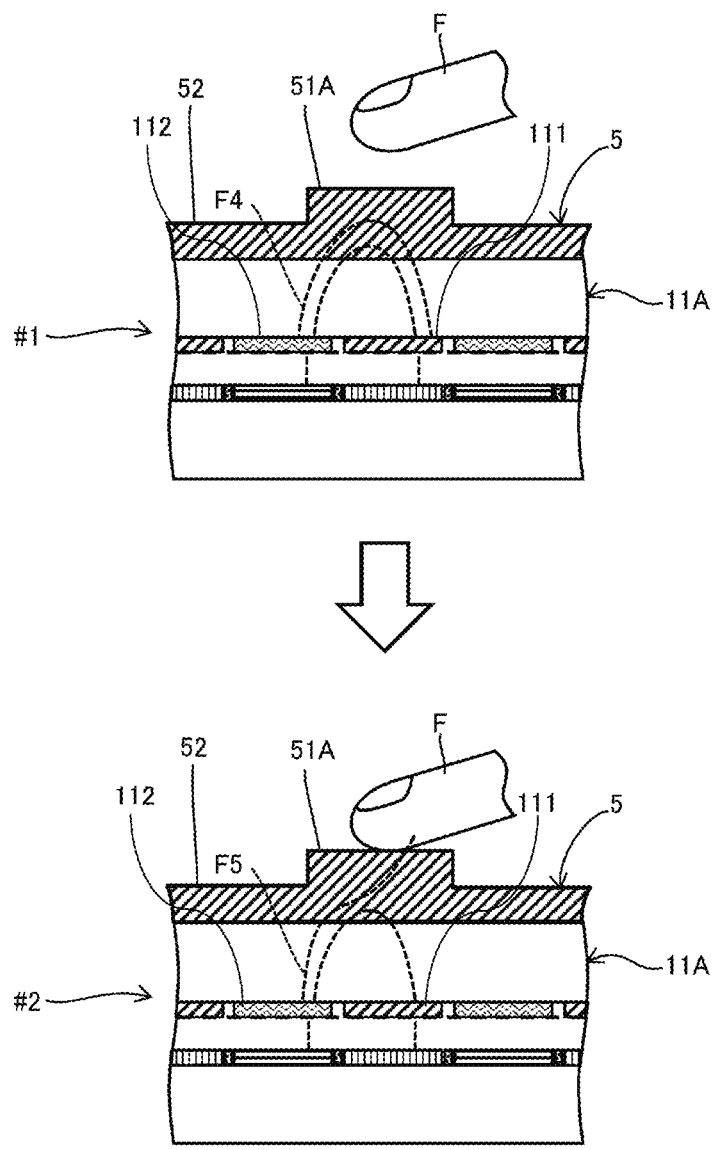
FIG. 5 is a diagram schematically illustrating an example of a configuration of an operation unit.
Figure 6:
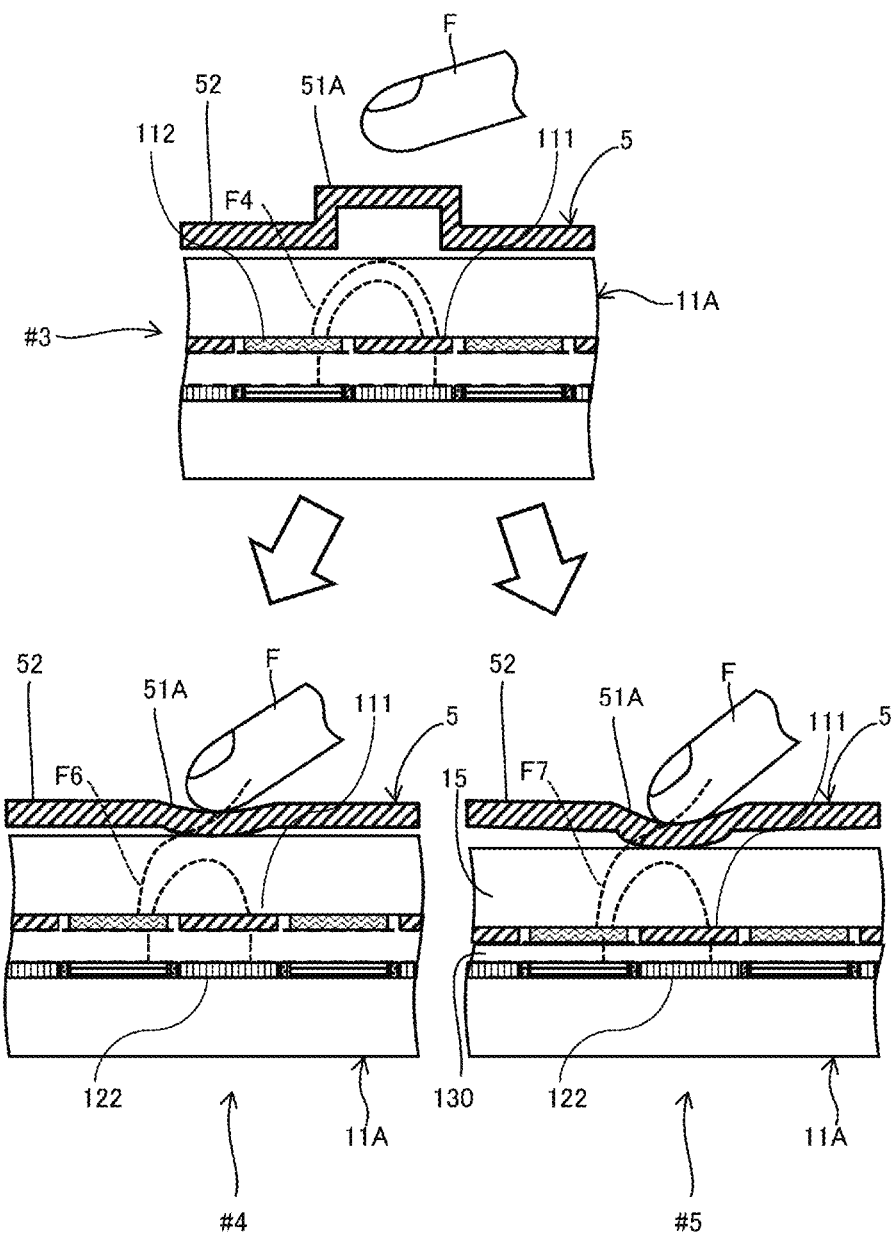
FIG. 6 is a diagram schematically illustrating another example of the configuration of the operation unit.

FIGS. 5 and 6 are views schematically illustrating examples of the configuration of the operation unit 51, and schematically illustrate a cross section at or near the operation unit 51 of the attachment 5. With reference to FIGS. 5 and 6, examples of states of attachment of the attachment 5 to the touch panel 11A, and transmission of user operation of the operation unit 51 will now be described.

Attachment of the attachment 5 to the touch panel 11A refers to, for example, placing the attachment 5 on the touch panel 11A in a state in which the attachment 5 is fully in contact with the touch panel 11A as illustrated in FIG. 5. At least the operation unit 51 of the attachment 5 is formed of a dielectric material that is the same as or similar to a material of the first substrate 15. Preferably, the operation unit 51 is made of a material having optical transparency. More preferably, the attachment 5, in its entirety, is made of a material having optical transparency.

From a state in which the attachment 5 is attached to the input device 1 (#1), when the pointer F comes into contact with the surface of a first operation unit 51A (#2), the electrostatic capacitance between the drive electrode 111 and the position detection electrode 121 decreases via the pointer F. As a result, as in the case in which the attachment 5 is not attached as described with reference to FIG. 2, contact of the pointer F with the front surface of the touch panel 11A and the operation position are detected. Transmission of the user operation here refers to the detection of contact of the pointer F at the corresponding position (first position) of the touch panel 11A via the first operation unit 51A of the attachment 5.

Attachment of the attachment 5 to the touch panel 11A may refer to, as another example, placing the attachment 5 on the touch panel 11A in a state in which the attachment 5 is fully in contact with the touch panel 11A with a gap provided in at least a portion, as illustrated in FIG. 6. At least the operation unit 51 of the attachment 5 is formed of a thin film having a sheet shape. At least the operation unit 51 of the attachment 5 is formed of an elastic material such as a polymer material, OCA, or OCR, for example.

In a state in which the attachment 5 is attached to the input device 1 (#3), when pressed by the pointer F from the surface of the first operation unit 51A, the first operation unit 51A deforms to protrude downward and comes into contact with the front surface of the touch panel 11A (#4). Therefore, the electrostatic capacitance between the drive electrode 111 and the position detection electrode 121 decreases via the pointer F. As a result, as in the case in which the attachment 5 is not attached as described with reference to FIG. 2, contact of the pointer F with the front surface of the touch panel 11A and the operation position are detected.

When the pressing force by the pointer F is large, the first operation unit 51A largely deforms to protrude downward, the first substrate 15 is pressed, and the dielectric layer 130 is compressed (#5). Therefore, the electrostatic capacitance between the drive electrode 111 and the pressing force detection electrode 122 in the touch panel 11A increases. Thus, as in the case in which the attachment 5 is not attached as described with reference to FIG. 2, receiving a pressing force at the front surface of the touch panel 11A being pressed by the pointer F via the first operation unit 51A, the operation position, and the magnitude of the pressing force are detected.

Preferably, at least one of the operation units 51 has a surface shape different from that of the base 52 which is a portion other than the operation units 51. As an example, as illustrated in FIGS. 1, 5, and 6, each of the operation units 51 has a shape protruding from the base 52. As another example, each operation unit 51 may have a shape recessed from the base 52, or a protruding shape and a recessed shape may be combined. Other examples of a factor different from the base 52 instead of the surface shape may include a friction coefficient (roughness) and a hardness.

With the surface shape of at least one of the operation units 51 being different from that of a portion other than the operation units 51, the user can identify each operation unit 51 by the surface shape. This allows the user to sense the operation unit 51 from a resistance resulting from the shape, a resistance resulting from the friction or hardness applied from the operation unit 51 to the pointer F, such as a finger or a pen, or the like. Therefore, operability can be maintained even in a case of operating without visually recognizing the operation unit 51, that is, a so-called blind touch, or in a case in which the operation unit 51 is operated while the operation unit 51 is not fully visible due to physical or environmental reasons.

Figure 7:
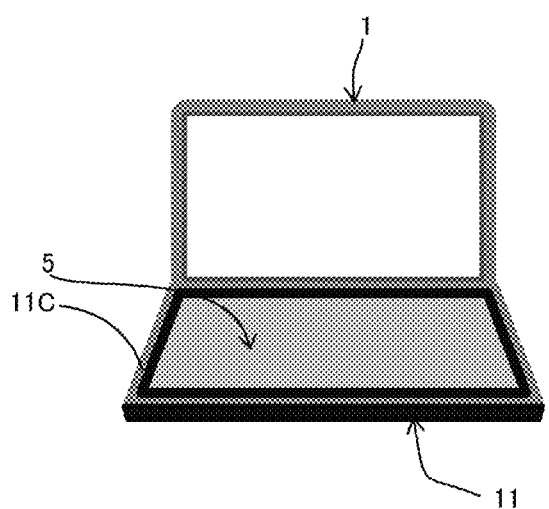
FIG. 7 is a schematic view illustrating an example of a method of attaching the attachment to the touch panel.

For example, assume that the attachment 5 is attached at a defined position of the input device 1. FIG. 7 is a schematic view illustrating an example of a method of attaching the attachment 5 to the touch panel 11A. For example, a size of the attachment 5 may be the same as a size of the first display 11, and the attachment 5 may be installed in alignment with a frame 11C of the first display 11.

Preferably, the attachment 5 further includes a locking unit 54 that locks the attachment 5 to the input device 1.

Locking refers to the suppression of displacement from the touch panel 11A, and may be, for example, fixing the state of attachment to the touch panel 11A.

Figure 8:
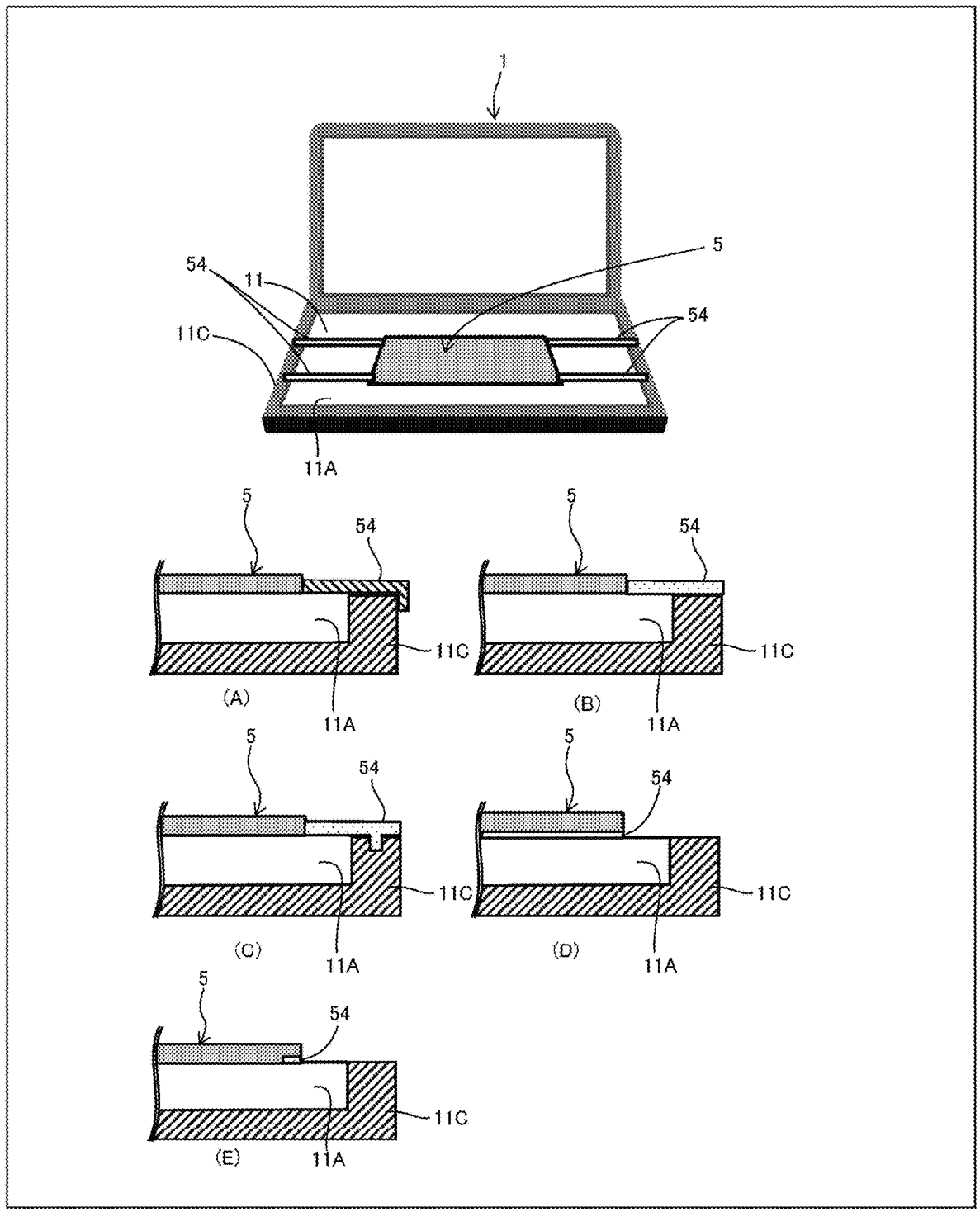
FIG. 8 is a schematic view of specific examples of a locking unit.

The locking unit 54, for example, fixes a back surface of the substrate 52 to the touch panel 11A. As a result, the attachment 5 is fixed in an attached state to the touch panel 11A. FIG. 8 is a schematic view of specific examples of the locking unit 54. FIG. 8 is a view schematically illustrating cross sections of the locking unit 54.

As a first example, as illustrated in (A), the locking unit 54 may have a structure that physically locks to the frame 11C of the first display 11. As a second example, as illustrated in (B), the locking unit 54 may include a magnet and be configured to be locked to the frame 11C of the first display 11 by magnetic force. As a third example, as illustrated in (C), the locking unit 54 may have a protruding or recessed shape, such as a button or a projection, and may be configured to be fitted to a recessed or protruding shape (not illustrated) provided on the frame 11C of the first display 11. As a result, the attachment 5 is fixed in an attached state to the frame 11C of the first display 11.

The locking unit 54 may have any configuration as long as displacement from the attached state is prevented. As a fourth example, as illustrated in (D), the locking unit 54 may be an adhesive sheet or a locking sheet disposed on the entire back surface of the base 52 and utilize viscosity or frictional force. Further, as a fifth example, as illustrated in (E), the locking unit 54 may be an adhesive sheet or a locking sheet and disposed on a portion of the back surface of the base 52. Thus, the attachment 5 can be easily attached to the touch panel 11A, and displacement of the attachment 5 from the touch panel 11A during use is suppressed.

Description of Processing in Input Device

Figure 9:
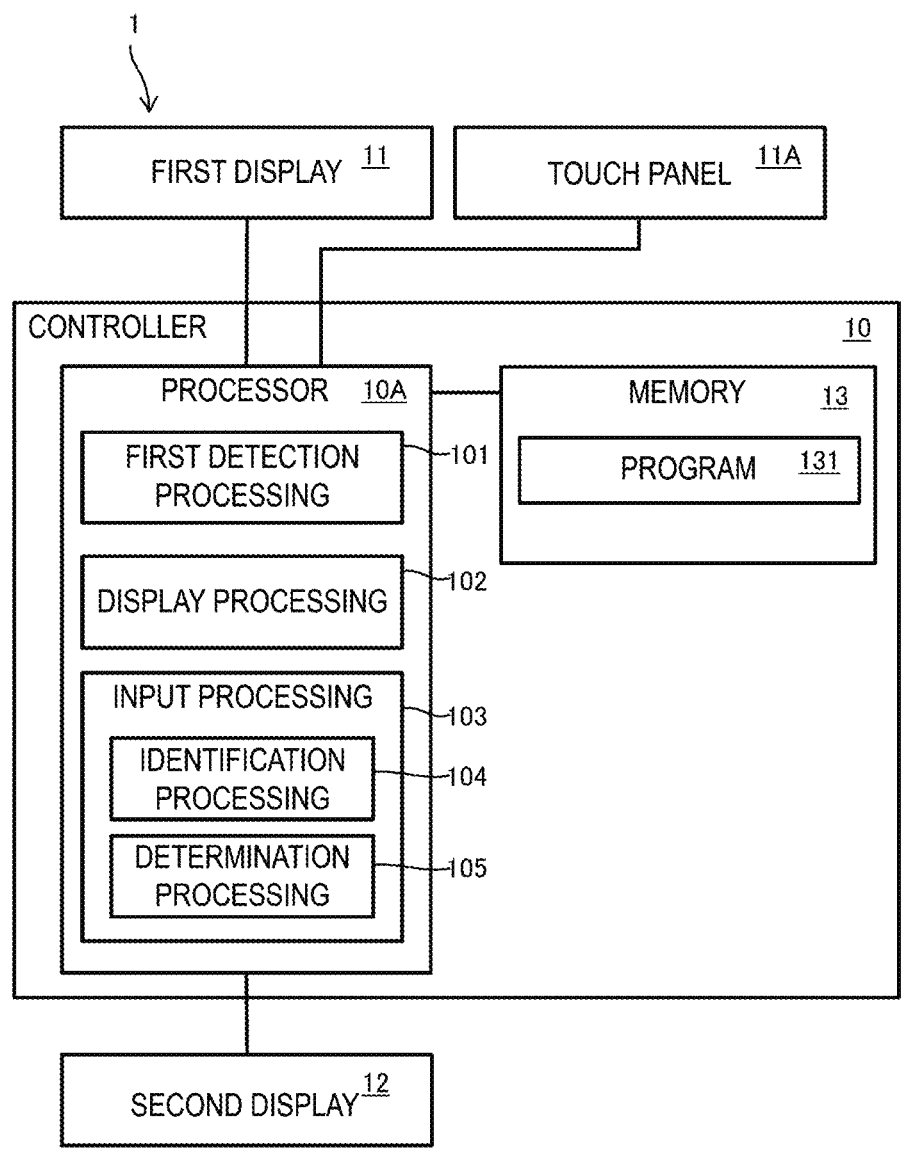
FIG. 9 is a schematic configuration diagram of an input device according to a first embodiment.

FIG. 9 is a schematic configuration diagram of the input device 1 according to a first embodiment. The input device 1 includes a controller 10. The controller 10 is connected to the first display 11 and the second display 12 to control displays thereof. The controller 10 is connected to the touch panel 11A, detects user operation on the touch panel 11A, and executes processing according to the user operation.

As an example, the controller 10 is constituted by a computer including a processor 10A and a memory 13. For example, the processor 10A is a central processing unit (CPU). The memory 13 includes, for example, a read only memory (ROM).

The memory 13 stores a computer program (hereinafter referred to as program) 131 executed by the processor 10A. The processor 10A executes processing for inputting information using the attachment 5 by executing the program 131.

The processor 10A executes first detection processing 101 by executing the program 131. The first detection processing 101 includes detecting an operation position on the touch panel 11A. As an example, the processor 10A detects, as the operation position, a position at which a change in the signal detected by the position detection electrode 121 occurs or a position at which a change in the signal detected by the pressing force detection electrode 122 occurs.

The processor 10A executes display processing 102 by executing the program 131. The display processing 102 includes displaying an image corresponding to the attachment 5 on the first display 11. The image corresponding to the attachment 5 is an image representing at least the operation unit 51 of the attachment 5 and, in this example, is an image of at least a key. Accordingly, for example, an image of a key is displayed in alignment with the operation unit 51 of the attachment 5 attached to the first display 11.

The processor 10A executes input processing 103 by executing the program 131. The input processing 103 refers to processing for generating and outputting output data in accordance with user operation. The output data is, for example, character display data in the case of character input operation. The outputting is, for example, displaying characters on the second display 12.

The input processing 103 includes identification processing 104. The identification processing 104 refers to identifying the content of the user operation performed using the attachment 5. The identification of the content of the user operation may be identification of the first operation unit 51A of the operation units 51 of the attachment 5 that received the user operation.

The processor 10A stores in advance positions on the touch panel 11A corresponding to each operation unit 51 of the attachment 5 when attached to the touch panel 11A. In this example, the processor 10A stores in advance positions on the touch panel 11A corresponding to each key. When a change occurs in the signal detected by the position detection electrode 121 or the signal detected by the pressing force detection electrode 122, the processor 10A determines that a position at which such a signal change occurs is the operation position (first position) on the touch panel 11A and identifies the first operation unit 51A corresponding to the first position. Thus, the key touched by the user operation is identified.

The input processing 103 includes determination processing 105. The determination processing 105 includes determining the output data in accordance with the content of the user operation. For example, when the identified content of the user operation is input of the character "A," the output data is determined to be data instructing input of the character "A."

Description of Input Method

Figure 10:
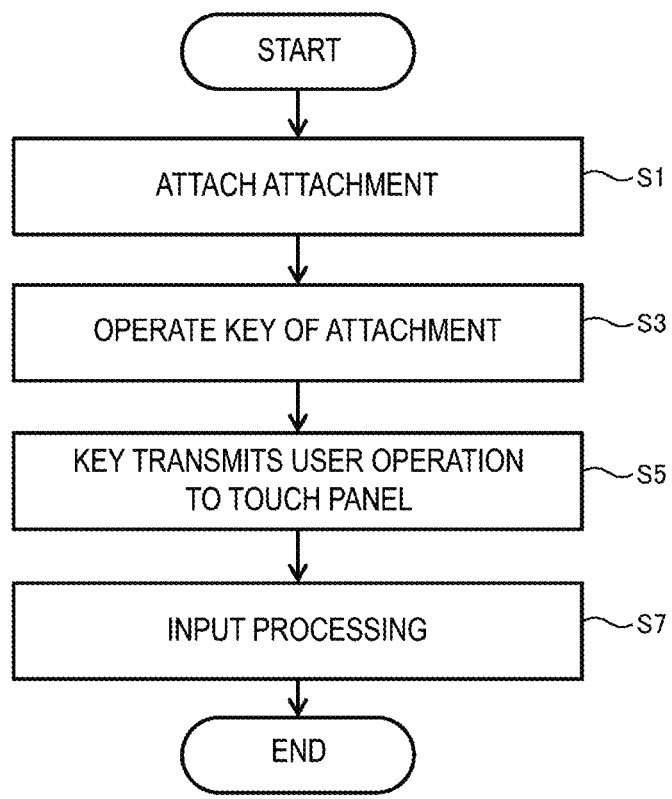
FIG. 10 is a flowchart illustrating an example of an input method of the input system.

FIG. 10 is a flowchart illustrating an example of an input method of the input system 100. The input method of the input system 100 is an input method of using the attachment 5 to input information to the input device 1 including the touch panel 11A.

First, the user attaches the attachment 5 to the input device 1 (step S1). The user operates the first operation unit 51A of the attachment 5 corresponding to the key desired to be operated (step S3).

When user operation is performed on the first operation unit 51A, the first operation unit 51A transmits the user operation to a corresponding position (first position) on the touch panel 11A in accordance with the user operation (step S5). In step S5, when the pointer touches the first operation unit 51A, the pointer touches the first position of the first substrate 15 of the touch panel 11A via the first operation unit 51A (FIGS. 5 and 6). This causes a change in the signal detected by the position detection electrode 121 at the first position and a change in the signal detected by the pressing force detection electrode 122. Upon detecting a change in the signals, the input device 1 executes the input processing 103 (step S7).

Figure 11:
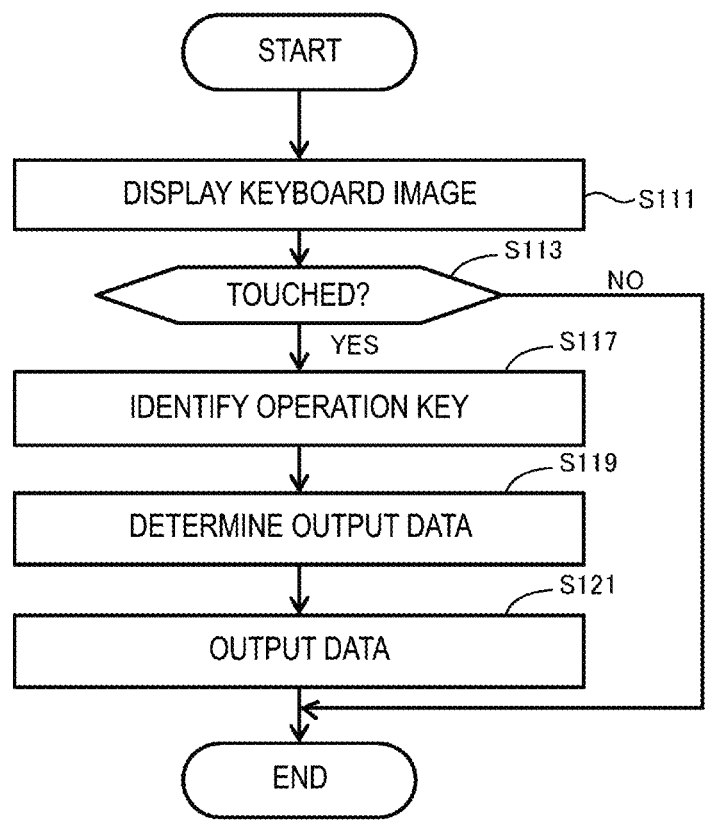
FIG. 11 is a flowchart illustrating an example of a flow of processing for inputting information using the attachment, the processing being performed in a controller of the input device according to the first embodiment.

FIG. 11 is a flowchart illustrating an example of a flow of processing for using the attachment 5 to input information, the processing being performed in the controller 10 of the input device 1 according to the first embodiment. The program 131 causes the controller 10 to execute the processing of FIG. 11.

The processor 10A causes the first display 11 to display image data corresponding to the attachment 5 and stored in advance (herein, image of a keyboard) (step S111). Thus, the image of a keyboard is displayed on the first display 11. The user can perform input operation by using the attachment 5 while viewing the image of the keyboard displayed on the first display 11 through the attachment 5 having optical transparency. Therefore, by attaching the attachment 5 to the touch panel 11A, the user can operate the touch panel 11A on the first display 11 while viewing the touch panel 11A like a keyboard.

The processor 10A monitors signals detected by the position detection electrode 121 and signals detected by the pressing force detection electrode 122. Thus, the user operation transmitted from the attachment 5 is monitored.

When a change occurs in the signal detected by the position detection electrode 121 or the signal detected by the pressing force detection electrode 122, the processor 10A detects that user operation was transmitted from the attachment 5 (YES in step S113). The processor 10A identifies the first operation unit 51A corresponding to the first position that is the position of the position detection electrode 121 or the pressing force detection electrode 122 at which the change in signal was detected (step S117). Thus, the content of the user operation is identified.

When the content of the user operation is identified, the processor 10A determines output data in accordance with the content of the user operation (step S119), and outputs the determined data (step S121).

Effects of First Embodiment

The controller 10 of the input device 1 executes the processing of FIG. 11 in accordance with the program 131, and thus the user can attach the attachment 5 to the touch panel 11A and perform operation for information input to the input device 1 using the attachment 5. Therefore, when the user wants to perform keyboard input on the touch panel 11A, the user can operate the touch panel 11A like a keyboard by attaching the attachment 5. Accordingly, user operability can be enhanced.

On the other hand, when the operation is finished, when another operation is to be performed, or when the touch panel is to be used as a display, the touch panel 11A can be easily switched to a state without the operation unit 51 by removing the attachment 5 from the touch panel 11A. Thus, user convenience is not impaired.

Second Embodiment

The attachment 5 and the input device 1 according to a second embodiment are integrated by the attachment 5 being attached to the touch panel 11A. The integration herein refers to the input device 1 detecting the attachment of the attachment 5 to the touch panel 11A and performing processing in accordance with the detection.

Figure 12A:
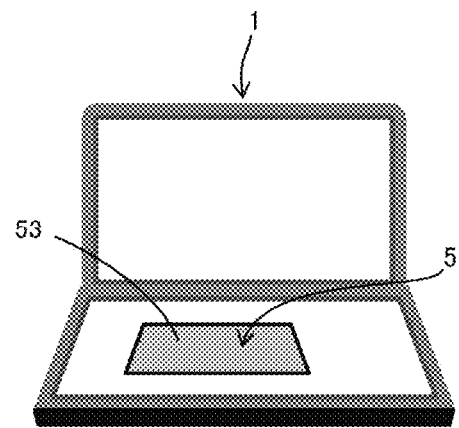
FIGS. 12A, 12B, and 12C are schematic views of specific examples of a detection unit.
Figure 12B:
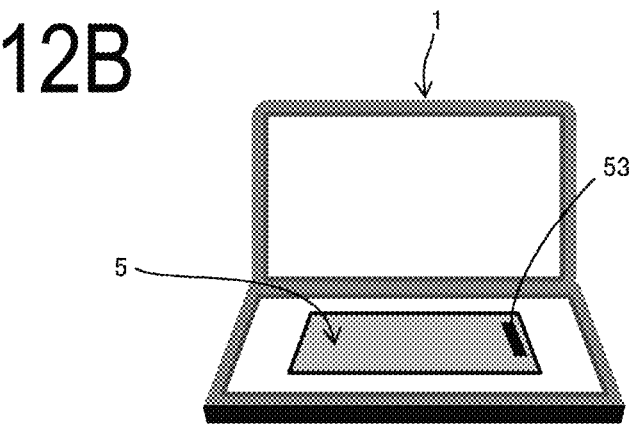
Figure 12C:
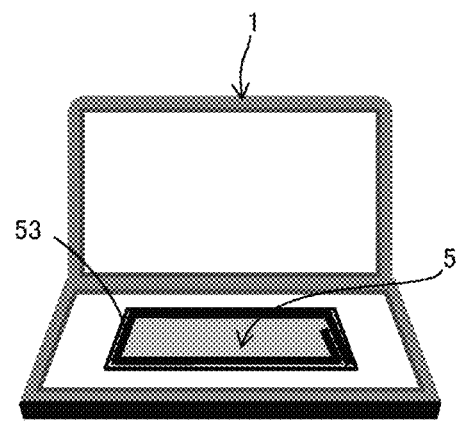

The attachment 5 according to the second embodiment is configured to be detectable by the input device 1. The attachment 5 according to the second embodiment includes a detection unit 53 as an example of a configuration that enables detection by the input device 1. FIGS. 12A, 12B, and 12C are schematic views of specific examples of the detection unit 53 according to the second embodiment.

The detection unit 53 according to a first example of the second embodiment is the entire attachment 5 as illustrated in (A). The attachment 5 is formed of a dielectric, and functions in its entirety as the detection unit 53. In this case, when the attachment 5 is attached to the touch panel 11A, a dielectric constant changes, and the electrostatic capacitance between the drive electrode 111 and the position detection electrode 121 changes.

Specifically, the dielectric has a polarity of a change in electrostatic capacitance between the drive electrode 111 and the position detection electrode 121. The polarity thereof of the dielectric differs from that of a conductor that is the pointer F such as a finger. That is, when the pointer F that is a conductor comes into contact with the surface, the electrostatic capacitance between the drive electrode 111 and the position detection electrode 121 decreases via the pointer F. On the other hand, when the dielectric comes into contact with the surface, the electrostatic capacitance increases.

The detection unit 53 according to a second example is an electrode disposed on the base 52, as illustrated in (B). In this case, the detection unit 53 comes into contact with the front surface of the touch panel 11A, thereby capacitive coupling the detection unit 53 with the position detection electrode 121 or the pressing force detection electrode 122, and changing a signal detected by the position detection electrode 121 or the pressing force detection electrode 122.

The detection unit 53 according to a third example is a near field communication (NFC) antenna disposed on the base 52, as illustrated in (C). In this case, the input device 1 includes a communication unit (not illustrated).

Figure 13:
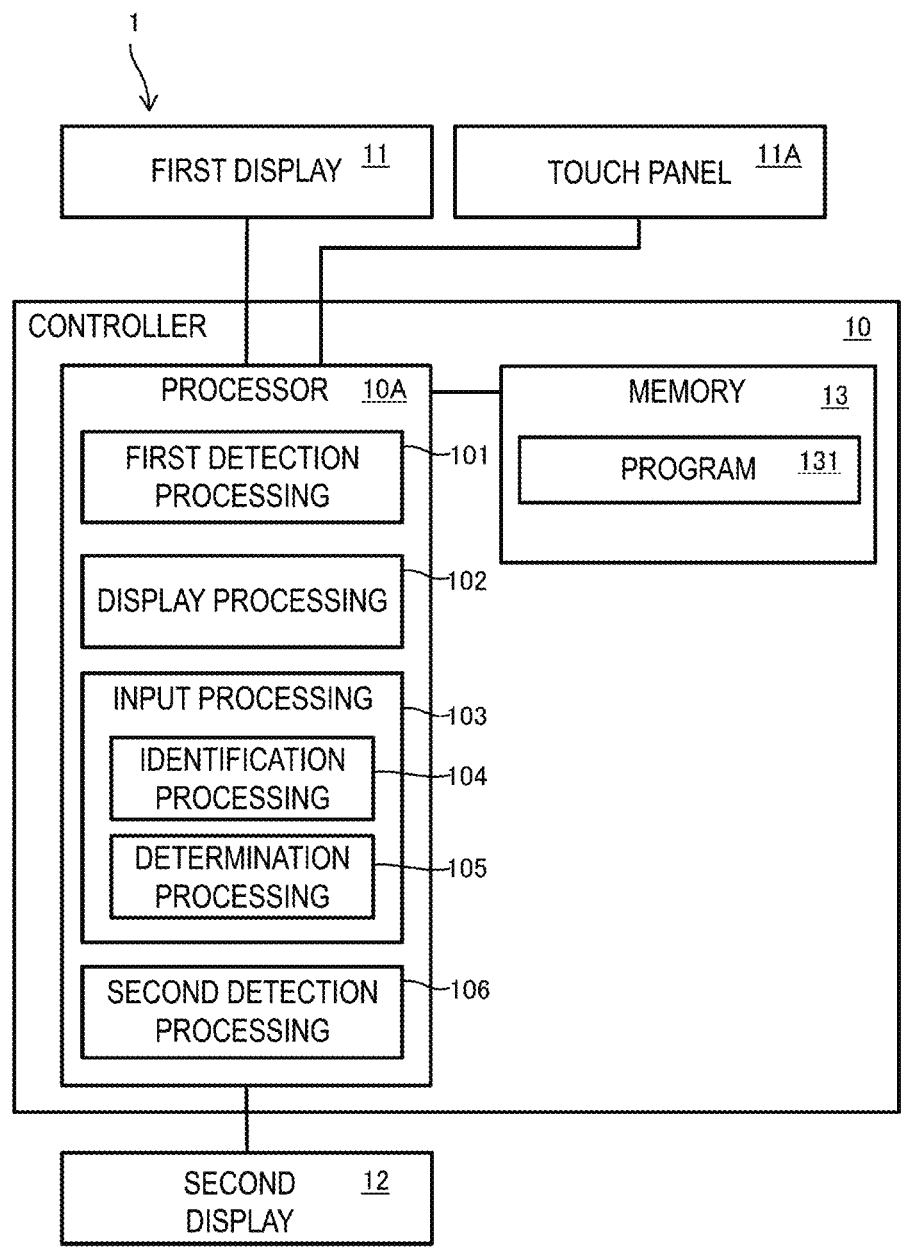
FIG. 13 is a schematic configuration diagram of the input device according to a second embodiment.

FIG. 13 is a schematic configuration diagram of the input device 1 according to the second embodiment, and differs from the configuration of FIG. 9 in that the processor 10A further executes second detection processing 106. That is, the processor 10A of the input device 1 according to the second embodiment further executes the second detection processing 106 by executing the program 131. The second detection processing 106 includes detecting attachment of the attachment 5.

Specifically, in the case in which the attachment 5 includes the detection unit 53 according to the first example, the processor 10A, in the second detection processing 106, detects attachment of the attachment 5 when detecting that the change in the electrostatic capacitance between the drive electrode 111 and the position detection electrode 121 is an increase from the signal detected by the position detection electrode 121. With the detection unit 53 being formed of a dielectric, the attachment of the attachment 5 and the touch by the pointer F are distinguished from each other by the change in electrostatic capacitance. As a result, erroneous operation of the touch panel 11A due to attachment of the attachment 5 can be suppressed.

When the attachment 5 includes the detection unit 53 according to the second example, the processor 10A, in the second detection processing 106, detects attachment of the attachment 5 by detecting a signal change in the position detection electrode 121 or the pressing force detection electrode 122. When the attachment 5 includes the detection unit 53 according to the third example, the processor 10A, in the second detection processing 106, causes the communication unit to perform near field communication, and detects attachment of the attachment 5 by the success of the near field communication with the detection unit 53.

Modified Example

In the above examples, attachment of the detection unit 53 is detected on the basis of a change in electrostatic capacitance or success or failure of wireless communication. However, the detection method is not limited to such methods. As another example, the input device 1 may include an optical sensor (not illustrated), and may optically detect the detection unit 53. In this case, the detection unit 53 is made of a material detectable by an optical sensor. The material detectable by an optical sensor is, for example, a material having a light transmittance lower than that in the state of non-attachment. Note that "the detection unit 53 may be optically detected" applies to the following embodiments as well.

Effects of Second Embodiment

In the second embodiment, once the processor 10A detects attachment of the attachment 5 by the second detection processing 106, processing for inputting information via the attachment 5 may be executed. In this case, the processing of FIG. 11 is started when the processor 10A detects attachment of the attachment 5. As a result, the user can perform operation using the attachment 5 by simply attaching the attachment 5 to the touch panel 11A, thereby improving convenience.

Third Embodiment

In a third embodiment, the integration refers to the input device 1 detecting the state of attachment of the attachment 5 to the touch panel 11A and performing processing in accordance with the detection. The state of attachment includes the position of the attachment 5 attached to the touch panel 11A. For example, when the size of the attachment 5 is smaller than that of the touch panel 11A as illustrated in FIGS. 12A, 12B, and 12C, the position (attachment position) of the attachment 5 attached to the touch panel 11A is not constant.

When the attachment 5 according to the third embodiment includes the detection unit 53 according to the first example of the second embodiment (FIG. 12A), the processor 10A, in the second detection processing 106, detects a range in which a change in electrostatic capacitance between the drive electrode 111 and the position detection electrode 121 is an increase, and determines that the attachment 5 is attached in that range, that is, sets the range as the attachment position of the attachment 5.

In a case in which the attachment 5 according to the third embodiment includes the detection unit 53 according to the second example of the second embodiment (FIG. 12B) and in a case in which the attachment 5 according to the third embodiment includes the detection unit 53 according to the third example of the second embodiment (FIG. 12C), the processor 10A stores in advance the position where the detection unit 53 is disposed on the attachment 5. In other words, the processor 10A stores the range of the attachment 5 with respect to the detection unit 53 in advance. In FIG. 12B, the detection unit 53 is disposed at the right end of the attachment 5 having a rectangular shape, in parallel with the right side. In this case, the processor 10A stores in advance, as the range of the attachment 5, a rectangular range with the detection unit 53 at the right end. In FIG. 12C, an antenna that is the detection unit 53 is disposed around the attachment 5 having a rectangular shape. In this case, the processor 10A stores in advance, as the range of the attachment 5, the range surrounded by the detection unit 53. Accordingly, in the second detection processing 106, the processor 10A can detect the position at which the change in electrostatic capacitance between the drive electrode 111 and the position detection electrode 121 increases, set the position as the position of the detection unit 53, and identify the attachment position of the attachment 5.

Figure 14:
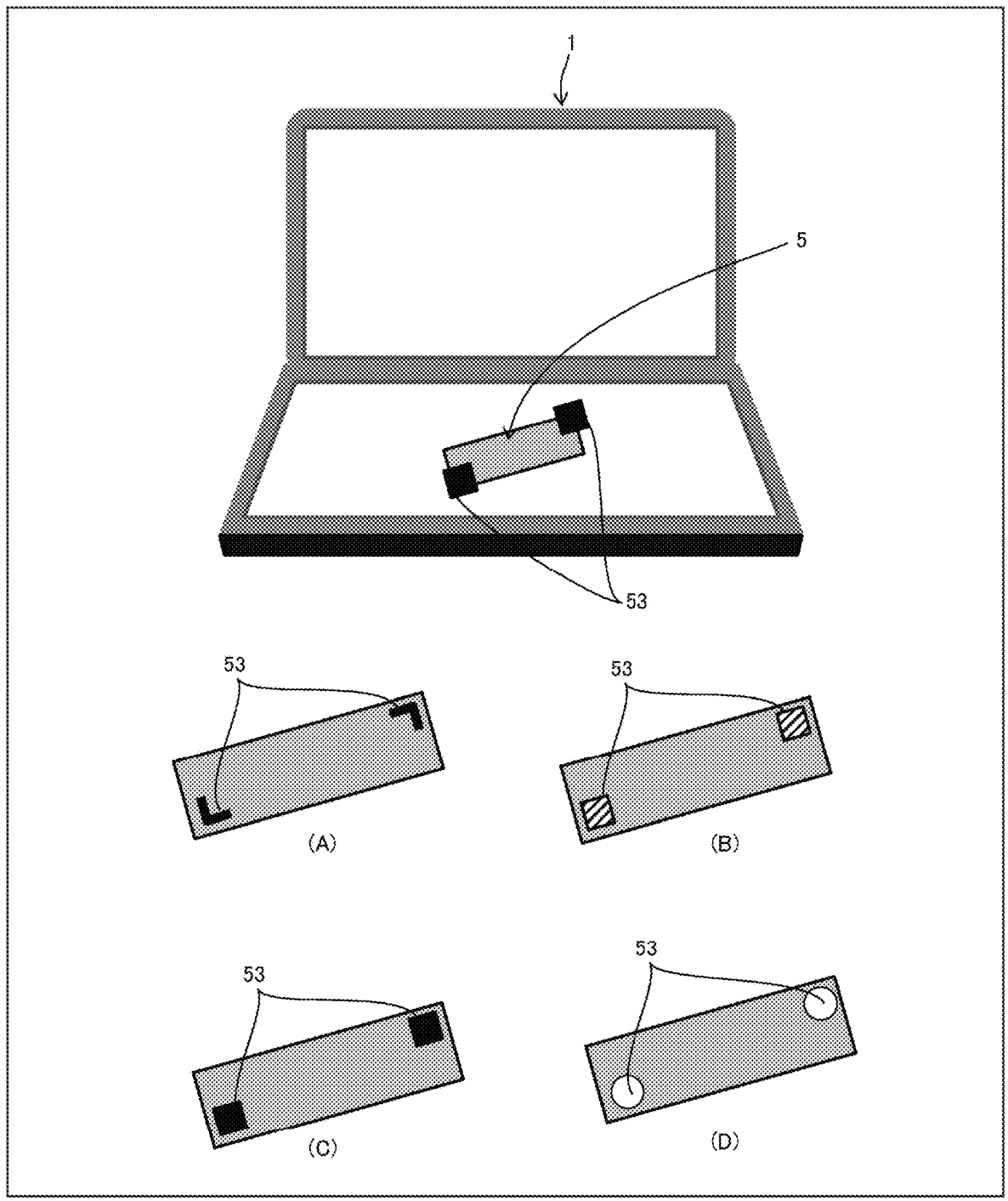
FIG. 14 is a schematic view of specific examples of the detection unit according to a third embodiment.

Preferably, the attachment position of the attachment 5 includes an inclination of the attachment 5. That is, the detection unit 53 is configured to enable detection, by the input device 1, of the inclination when attached to the touch panel 11A. Being configured to enable detection of the inclination may be, for example, being disposed at two or more locations on the base 52 of the attachment 5. FIG. 14 is a schematic view of specific examples of the detection unit 53 according to the third embodiment.

The detection units 53 according to a first example of the third embodiment are angled electrodes disposed at diagonal positions of the base 52 having a rectangular shape, as illustrated in (A). In the case of (A), the detection units 53, which are electrodes bent at an angle of 90 degrees, are disposed at a lower left corner and an upper right corner of the attachment 5 so that linear portions are parallel with the sides of the attachment 5.

The detection units 53 according to a second example are formed of a material that changes the electrostatic capacitance between the drive electrode 111 and the position detection electrode 121, such as a dielectric, and are disposed at diagonal positions of the base 52 having a rectangular shape, as illustrated in (B).

The detection units 53 according to the third example are portions having a thickness different from that of the base 52, and are disposed at diagonal positions of the base 52 having a rectangular shape, as illustrated in (C). Having a different thickness may be having a thickness greater or smaller than that of the base 52. Having a smaller thickness may be being a hole, as illustrated in (D).

In the case in which the attachment 5 includes the detection units 53 according to the first to third examples, as in the above description, the processor 10A in the second detection processing 106 can detect the detection units 53 by a change in electrostatic capacitance between the drive electrode 111 and the position detection electrode 121, as described above.

In this case, the processor 10A stores in advance the positions where the detection units 53 are disposed on the attachment 5. In other words, the processor 10A stores the range of the attachment 5 with respect to the detection units 53 in advance. In the example of FIG. 14, the detection units 53 are disposed at the lower left and the upper right of the attachment 5 having a rectangular shape. In this case, the processor 10A stores in advance, as the range of the attachment 5, a range in which the two detection units 53 are diagonally disposed. Note that, in a case in which the range of the attachment 5 with respect to the detection units 53 is stored in advance, the positions of the detection units 53 are not limited to diagonal positions.

Accordingly, in the second detection processing 106, the processor 10A can detect two positions at which the change in the electrostatic capacitance between the drive electrode 111 and the position detection electrode 121 increases, and identify the attachment position of the attachment 5 by using the two positions as the positions of the two detection units 53. For example, the processor 10A stores in advance the angles formed by the two detection units 53 in a reference attachment state to the touch panel 11A (for example, a state in which the four sides coincide) as reference angles, making it possible to obtain the inclination of the attachment 5 on the basis of the detected angles of the two detection units 53 and the reference angles.

The input device 1 according to the third embodiment has the same configuration as that of the input device 1 according to the second embodiment (FIG. 13), and the second detection processing 106 includes detection of the attachment state of the attachment 5. That is, when the attachment 5 includes the detection units 53 according to the first to third examples, the processor 10A, in the second detection processing 106, identifies the positions of the detection units 53 on the touch panel 11A by detecting a signal change in the position detection electrode 121 or the pressing force detection electrode 122.

The display processing 102 of the input device 1 according to the third embodiment includes adjusting the display position of the image corresponding to the attachment 5 and displayed on the first display 11 in accordance with the position of the attachment 5. Adjusting the display position includes rotating (inclining) the attachment 5 in accordance with the inclination of the attachment 5. Accordingly, for example, an image of a key is displayed in alignment with the operation unit 51 of the attachment 5 attached to the first display 11.

In the input device 1 according to the third embodiment, the processor 10A identifies, in the identification processing 104, the content of the user operation performed using the attachment 5 by further using the attachment position of the attachment 5. That is, in a case in which user operation is transmitted from the attachment 5 to the first position on the touch panel 11A, the processor 10A identifies the first operation unit 51A corresponding to the first position by further using the attachment position of the attachment 5.

Figure 15:
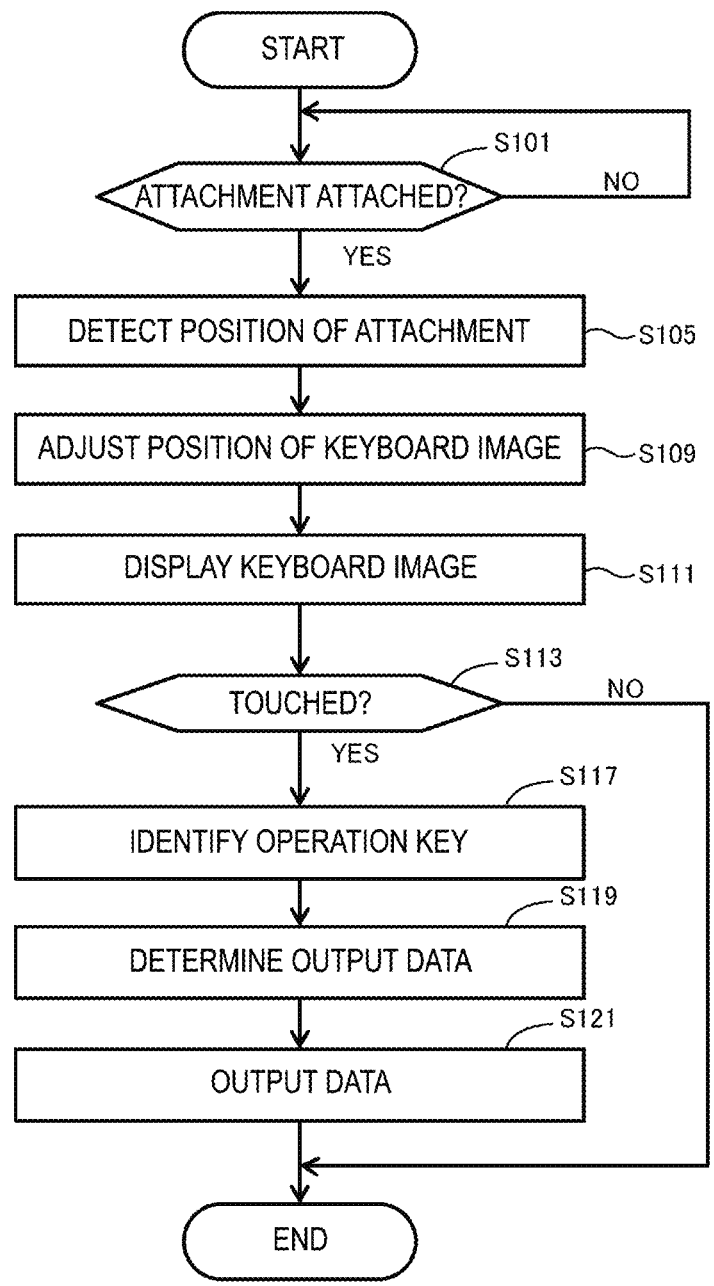
FIG. 15 is a flowchart illustrating an example of a flow of processing for inputting information using the attachment, the processing being performed in the controller of the input device according to the third embodiment.

FIG. 15 is a flowchart illustrating an example of a flow of processing for using the attachment 5 to input information, the processing being performed in the controller 10 of the input device 1 according to the third embodiment. The processing in FIG. 15 differs from the processing in FIG. 11 in that the processor 10A further executes steps S101, S105, and S109. FIG. 15 is a specific example of processing in a case in which the attachment 5 includes the detection units 53 according to the second example.

In this case, the processor 10A of the controller 10 monitors the signal detected by the position detection electrode 121 and, when a change occurs in the signal, the processor 10A detects that the attachment 5 is attached (YES in step S101). The processor 10A detects the positions of the two detection units 53 included in the attachment 5 on the basis of the position detection electrode 121 having the changed signal, and identifies the attachment position of the attachment 5 from the positions of the two detection units 53 (step S105).

The processor 10A adjusts the display position of the image data corresponding to the attachment 5 stored in advance (herein, image of a keyboard) in accordance with the attachment position of the attachment 5 (step S109), and displays the adjusted display position on the first display 11 (step S111).

When a change occurs in the signal detected by the position detection electrode 121 or the signal detected by the pressing force detection electrode 122, the processor 10A detects that user operation has been performed on the touch panel 11A using the attachment 5 (YES in step S113). The processor 10A identifies the first operation unit 51A corresponding to the first position on the basis of the first position, which is the position of the position detection electrode 121 or the pressing force detection electrode 122 at which the change in signal was detected, and the attachment position of the attachment 5 (step S117). Thereafter, the same processing as that of the first embodiment is performed.

Effects of Third Embodiment

From the above, the image of the keyboard is displayed on the first display 11 in accordance with the attachment position of the attachment 5. Further, with use of the attachment position of the attachment 5, the first operation unit 51A is identified from the first position of the touch panel 11A to which the user operation is transmitted.

For example, in a case in which the attachment 5 is smaller in size than the touch panel 11A, the attachment position of the attachment 5 on the touch panel 11A is not constant, as illustrated in FIGS. 12A, 12B, and 12C. Further, as illustrated in FIG. 14, the attachment 5 may be attached to the touch panel 11A in an inclined manner. Even in such a case, the attachment position of the attachment 5 is detected by the input device 1, the image of the keyboard is displayed, and the content of the user operation is identified. Accordingly, the user can perform operation using the attachment 5 without strictly positioning the attachment 5 during attachment. As a result, the attachment 5 can be easily attached by the user, improving convenience.

Fourth Embodiment

In this example, the information input means is a keyboard, but may be a pen, a button, or the like. The attachment 5 according to a fourth embodiment further includes a marking indicating the attachment type. The marking is, for example, a marking 55 (refer to FIG. 1) indicating the type of the attachment 5. The type of the attachment 5 corresponds to the type of information input and is, for example, keyboard input, pen input, or button input. As another example, the type of the attachment 5 may be a type of keyboard. This is because the arrayed keys, the size of the keys, and the like vary depending on the type of the keyboard.

The marking 55 is, for example, a marking that can be optically identified. For example, the marking is a character string or a graphic that is a symbol or the like representing the type. In this case, the input device 1 includes a sensor (not illustrated) for optically reading information and reads the marking 55.

The marking 55 is not limited to a marking that can be optically recognized, and may be in any form as long as the marking carries information that enables the sensor included in the input device 1 to read the type of the attachment 5.

The input device 1 according to the fourth embodiment stores a plurality of screen data corresponding to a plurality of types of the attachment 5. The display processing 102 of the input device 1 according to the fourth embodiment includes selecting screen data corresponding to the type of the attachment 5 read from the marking 55 and displaying an image thereof on the first display 11. Thus, an image corresponding to the type of the attachment 5 attached is displayed.

In the input device 1 according to the fourth embodiment, the processor 10A, in the identification processing 104, identifies the content of the user operation performed using the attachment 5 by further using the type of the attachment 5 read from the marking 55. That is, the processor 10A stores the positions of the operation units 51 for each type of the attachment 5 in advance, and identifies the position of each operation unit 51 on the touch panel 11A on the basis of the type of the attachment 5 read from the marking 55. That is, in a case in which the user operation is transmitted from the attachment 5 to the first position of the touch panel 11A, the processor 10A identifies the first operation unit 51A corresponding to the first position on the basis of the type of the attachment 5.

Modified Example

Note that the type of the attachment 5 may include the size of the attachment 5. For example, for the same keyboard, there may be a large size and a small size. In this case, instead of reading the marking 55, the input device 1 may detect the size of the attachment 5 described in the third embodiment and select image data of a size corresponding to that size.

Effects of Fourth Embodiment

From the above, the user can use a plurality of types of attachments 5 to operate the input device 1. As a result, the user can perform input operation of a desired type on the input device 1 simply by replacing the attachment 5.

Modified Example

In the above description, the attachment 5 is a member having a rectangular shape such as a keyboard, but the shape of the attachment 5 is not limited to a rectangle. In this case, the detection unit 53 for detecting the position of the attachment 5 is provided to the attachment 5 at positions and in a quantity by which the position can be detected. Further, the detection unit 53 for detecting the inclination of the attachment 5 is provided to the attachment 5 at positions and in a quantity by which the inclination can be detected.

Modified Example

In the above description, the input device 1 stores the range of the attachment 5 in advance. However, the input device 1 need only store at least the positions of the operation units 51. Accordingly, the position of each operation unit 51 with respect to the touch panel 11A can be identified in a state of attachment to the touch panel 11A. As a result, the first operation unit 51A can be identified from the first position.

Modified Example

In the above description, the input device 1 is a personal computer including the two screens of the first display 11 and the second display 12, but the input device 1 is not limited to such a personal computer and may be any input device as long as the device includes a touch panel. In addition to a personal computer, the input device 1 may be a device such as a tablet or a foldable organic light-emitting diode (OLED).

Each of the first to fourth embodiments and the modified examples described above may be implemented alone, or any two or more may be combined.

The disclosure is not limited to the embodiments described above, and various modifications can be made. Further, the attachment, the input device, the input method, and the computer program according to the embodiments can also be expressed as follows.

(1) An attachment according to an embodiment is attachable to and detachable from a touch panel of an input device including the touch panel, and the attachment is configured to support user operation on the input device by being attached to the touch panel. The attachment includes one or more operation units configured to receive user operation and transmit the user operation to a corresponding position of the touch panel when the attachment is attached to the touch panel.

With this configuration, the attachment is attached to the input device, supporting input and facilitating input operation. In addition, when input using the attachment is not performed, the attachment can be easily removed, facilitating use without the attachment. This makes it possible to achieve both user convenience and operability as an input device.

(2) The attachment described in (1) preferably further includes a detection unit configured to enable detection, by the input device, of attachment of the attachment to the touch panel. This makes it possible to detect, by the input device to which the attachment is attached, attachment of the attachment to the touch panel.

(3) In the attachment described in (2), preferably the detection unit is configured to enable detection, by the input device, of an inclination when the attachment is attached to the touch panel. This makes it possible to detect, by the input device to which the attachment is attached, the inclination when the attachment is attached to the touch panel.

(4) The attachment described in one of (1) to (3) preferably further includes a marking indicating an attachment type. This makes it possible to read, by the input device to which the attachment is attached, the attachment type.

(5) In the attachment described in any one of (1) to (4), at least one of the one or more operation units has a surface shape different from a surface shape of a portion other than the one or more operation units. This makes it possible for the user to identify the operation unit by the surface shape.

(6) The attachment described in any one of (1) to (5) further includes a locking unit configured to lock the attachment to the touch panel. Locking refers to the suppression of displacement from the touch panel and is, for example, fixing the state of attachment to the touch panel. Thus, the attachment can be easily attached to the touch panel, and displacement of the attachment from the touch panel during use is suppressed.

(7) In the attachment described in any one of (1) to (6), at least the one or more operation units are made of a material having optical transparency. Accordingly, when the attachment is attached to the touch panel, a lower image displayed on the touch panel can be visually recognized through the attachment.

(8) An input device according to an embodiment is an input device configured to be attachably and detachably provided with an attachment, the attachment including one or more operation units and being configured to support user operation on the input device. The input device includes a touch panel to which the attachment is attachable and from which the attachment is detachable, and a controller configured to execute processing in accordance with operation on the touch panel. The one or more operation units are each configured to receive user operation and transmit the user operation to a first position of the touch panel, the first position being a corresponding position when the attachment is attached. The processing includes identifying, from the first position, a first operation unit, of the one or more operation units of the attachment, receiving the user operation.

With this configuration, the attachment is attached to the input device, supporting input and facilitating input operation. In addition, when input using the attachment is not performed, the attachment can be easily removed, facilitating use without the attachment. The input device can receive input operation input to the input device via the attachment. As a result, it is possible to achieve both user convenience and operability as an input device.

(9) In the input device described in (8), preferably the attachment includes a detection unit configured to enable detection, by the input device, of attachment of the attachment to the touch panel, the processing further includes identifying an attachment position of the attachment to the touch panel by detecting the detection unit, and the controller is configured to identify the first operation unit using the attachment position and the first position. Accordingly, the first operation unit is identified without performing strict positioning when the attachment is attached. As a result, the attachment can be easily attached by the user, and convenience is improved.

(10) In the input device described in (8) or (9), preferably the processing further includes determining output data from the first operation unit of the touch panel. Accordingly, user operation can be performed on the input device using the attachment.

(11) The input device described in any one of (8) to (10) preferably further includes a display overlapping the touch panel. Preferably, the attachment includes a detection unit configured to enable detection, by the input device, of attachment of the attachment to the touch panel, and the processing further includes displaying an image corresponding to the one or more operation units of the attachment when attachment of the attachment is detected by detecting the detection unit. Accordingly, in a case in which the attachment is made of a material having optical transparency, the user can perform operation while visually recognizing each operation unit on the touch panel. Therefore, the operability as an input device can be further improved.

(12) The input device described in any one of (8) to (11) preferably further includes a haptic device configured to apply, via the attachment, a mechanical stimulus corresponding to operation on the touch panel to a user of the attachment attached. Thus, the user operating the touch panel via the attachment can obtain an operation feel by receiving the mechanical stimulus.

(13) An input method according to an embodiment is an input method of inputting information to an input device including a touch panel by using an attachment attachable to and detachable from the touch panel. The attachment includes one or more operation units configured to receive user operation and transmit the user operation to a corresponding position of the touch panel when the attachment is attached. The input method includes attaching the attachment to the touch panel, receiving, in the attachment, user operation on a first operation unit of the one or more operation units and transmitting the user operation to a first position of the touch panel, the first position corresponding to the first operation unit, and identifying, in the input device, the first operation unit from the first position.

According to this input method, the user can attach the attachment to perform input operation on the input device. In addition, when input using the attachment is not performed, the attachment can be easily removed, facilitating use without the attachment. Thus, both user convenience and operability as an input device can be achieved.

(14) A computer program according to an embodiment causes a controller of an input device including a touch panel to execute processing of inputting information using an attachment attachable to and detachable from the touch panel. The attachment includes one or more operation units configured to receive user operation and transmit the user operation to a first position of the touch panel, the first position being a corresponding position when the attachment is attached. The computer program causes the controller to identify, from the first position, a first operation unit, of the one or more operation units of the attachment, receiving the user operation.

By this computer program, the controller causes the input device to receive user operation via the attachment attached. Thus, both user convenience and operability as an input device can be achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An input device configured to be attachably and detachably provided with an attachment unit, the attachment unit including one or more operation units and being configured to support a user operation on the input device, the input device comprising:
   a touch panel to which the attachment unit is attachable and from which the attachment unit is detachable; and
   a controller configured to execute processing, the processing including input processing in accordance with an operation on the touch panel and identification processing that identifies an attachment position of the attachment unit to the touch panel,
   wherein each of the one or more operation units is configured to receive the user operation and transmit the user operation to a first position of the touch panel, the first position being a corresponding position when the attachment unit is attached,
   the attachment unit further includes two detection units configured to enable detection, by the input device, of attachment of the attachment unit to the touch panel,
   the two detection units are disposed at diagonal positions of the attachment unit having a rectangular shape,
   the input device stores, in advance, angles, formed by the two detection units in a reference attachment state to the touch panel, as reference angles,
   the identification processing includes identifying an inclination of the attachment unit based on angles of the two detection units detected by the input device and the reference angles, and identifying the attachment position based on the inclination of the attachment unit, and
   the input processing includes identifying, based on the attachment position and the first position, a first operation unit, of the one or more operation units of the attachment unit, receiving the user operation.

2. The input device according to claim 1,
   wherein the processing further includes determination processing that determines output data from the first operation unit of the touch panel.

3. The input device according to claim 1, further comprising:
   a display overlapping the touch panel,
   wherein the processing further includes display processing that displays an image corresponding to the one or more operation units of the attachment unit when the attachment of the attachment unit is detected by detecting the two detection units, and
   the display processing includes adjusting a display position of the image on the display by rotating the image in accordance with the inclination of the attachment unit.

4. The input device according to claim 1, further comprising:
   a haptic device configured to apply, via the attachment unit, a mechanical stimulus corresponding to the operation on the touch panel to a user of the attached attachment unit.

5. The input device according to claim 1,
wherein the attachment unit further includes a marking indicating an attachment type.

6. The input device according to claim 1,
wherein at least one of the one or more operation units has a surface shape different from a surface shape of a portion other than the one or more operation units.

7. The input device according to claim 1,
wherein the attachment unit further includes a locking unit configured to lock the attachment unit to the touch panel.

8. The input device according to claim 1,
wherein at least the one or more operation units are made of a material having optical transparency.

9. An input method of inputting information to an input device, including a touch panel, by using an attachment unit attachable to and detachable from the touch panel,
wherein the attachment unit includes:
one or more operation units configured to receive a user operation and transmit the user operation to a corresponding position of the touch panel when the attachment unit is attached, and
two detection units configured to enable detection, by the input device, of attachment of the attachment unit to the touch panel, the two detection units being disposed at diagonal positions of the attachment unit having a rectangular shape, and
the input device stores, in advance, angles, formed by the two detection units in a reference attachment state to the touch panel, as reference angles,
the input method comprising:
attaching the attachment unit to the touch panel;
identifying an inclination of the attachment unit based on angles of the two detection units detected by the input device and the reference angles;
identifying the attachment position based on the inclination of the attachment unit;
receiving, in the attachment unit, the user operation on a first operation unit of the one or more operation units and transmitting the user operation to a first position of the touch panel, the first position corresponding to the first operation unit; and
identifying, in the input device, the first operation unit based on the attachment position and the first position.

10. A computer program causing a controller of an input device including a touch panel to execute processing of inputting information using an attachment unit attachable to and detachable from the touch panel,
wherein the attachment unit includes:
one or more operation units configured to receive a user operation and transmit the user operation to a first position of the touch panel, the first position being a corresponding position when the attachment unit is attached, and
two detection units configured to enable detection, by the input device, of attachment of the attachment unit to the touch panel, the two detection units being disposed at diagonal positions of the attachment unit having a rectangular shape,
the input device stores, in advance, angles, formed by the two detection units in a reference attachment state to the touch panel, as reference angles, and
the computer program causes the controller to:
identify an inclination of the attachment unit based on angles of the two detection units detected by the input device and the reference angles,
identify the attachment position based on the inclination of the attachment unit, and
identify, based on the attachment position and the first position, a first operation unit, of the one or more operation units of the attachment unit, receiving the user operation.

* * * * *